(12) United States Patent
Gandhi

(10) Patent No.: US 11,195,506 B2
(45) Date of Patent: Dec. 7, 2021

(54) SOUND-MODULATING WINDOWS

(71) Applicant: Toyota Motor Engineering & Manufacturing North America, Inc., Plano, TX (US)

(72) Inventor: Umesh N. Gandhi, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 379 days.

(21) Appl. No.: 16/207,459

(22) Filed: Dec. 3, 2018

(65) Prior Publication Data
US 2020/0175955 A1 Jun. 4, 2020

(51) Int. Cl.
*G10K 11/178* (2006.01)
*B60J 1/20* (2006.01)

(52) U.S. Cl.
CPC .......... *G10K 11/17823* (2018.01); *B60J 1/20* (2013.01); *G10K 2210/1291* (2013.01); *G10K 2210/12821* (2013.01)

(58) Field of Classification Search
CPC ........ B60R 2011/0026; H01L 41/0906; H04R 2440/05; H04R 2499/13; H04R 7/045; H04R 7/04; G10K 2210/1282; G10K 2210/1291; G10K 2210/118; G10K 2210/12; G10K 2210/3212; G10K 9/121
See application file for complete search history.

(56) References Cited

U.S. PATENT DOCUMENTS

| | | |
|---|---|---|
| 2,241,086 A | 1/1939 | Gould |
| 4,286,910 A | 9/1981 | Conrad |
| 4,319,427 A | 3/1982 | Way, Jr. |
| 4,726,656 A | 2/1988 | Schofield et al. |
| 4,848,179 A | 7/1989 | Ubhayakar |
| 4,958,100 A | 9/1990 | Crawley et al. |

(Continued)

FOREIGN PATENT DOCUMENTS

| | | |
|---|---|---|
| DE | 20106594 U1 | 5/2002 |
| JP | H07303381 A | 11/1995 |

(Continued)

OTHER PUBLICATIONS

Acome et al., "Hydraulically Amplified Self-Healing Electrostatic Actuators with Muscle-Like Performance," Science, vol. 359, Issue 6371, pp. 61-65 (Jan. 5, 2018) (6 pages).

(Continued)

*Primary Examiner* — Kile O Blair
(74) *Attorney, Agent, or Firm* — Christopher G. Darrow; Darrow Mustafa PC

(57) ABSTRACT

A sound-modulating window assembly, as well as systems and methods of using and operating the same, are disclosed herein. The sound-modulating window assembly can include sensors, a controller, and a sound modulation assembly. The sound-modulating window assembly The sound-modulating window assembly can receive information about one or more sounds in a vehicular environment. Then, the sound-modulating window assembly can produce a modulation profile. The modulation profile can be used by the sound modulation assembly to alter one or more characteristics of the windows, such that the sounds are mitigated or minimized.

19 Claims, 8 Drawing Sheets

(56) References Cited

U.S. PATENT DOCUMENTS

| | | | |
|---|---|---|---|
| 4,964,062 A | 10/1990 | Ubhayakar et al. | |
| 5,021,798 A | 6/1991 | Ubhayakar | |
| 5,065,978 A | 11/1991 | Albarda et al. | |
| 5,222,668 A | 6/1993 | Frankeny et al. | |
| 5,502,345 A | 3/1996 | Kahn et al. | |
| 5,536,062 A | 7/1996 | Spears | |
| 5,668,432 A | 9/1997 | Tominaga et al. | |
| 5,812,684 A * | 9/1998 | Mark | G10K 11/178 381/86 |
| 6,023,123 A * | 2/2000 | Petiet | G10K 11/17875 310/322 |
| 6,065,978 A | 5/2000 | Dehan et al. | |
| 6,120,002 A | 9/2000 | Biegelsen et al. | |
| 6,215,221 B1 | 4/2001 | Cabuz et al. | |
| 6,490,960 B1 | 12/2002 | Jackson et al. | |
| 6,685,442 B2 | 2/2004 | Chinn et al. | |
| 6,702,301 B1 | 3/2004 | Davies et al. | |
| 6,830,071 B2 | 12/2004 | Xu et al. | |
| 6,939,291 B2 | 9/2005 | Phee Soo Jay | |
| 7,106,867 B2 * | 9/2006 | Daly | G10K 11/17837 381/71.4 |
| 7,353,747 B2 | 4/2008 | Swayze et al. | |
| 7,382,083 B2 | 6/2008 | Takahashi | |
| 7,484,735 B2 | 2/2009 | Verbugge et al. | |
| 7,575,807 B1 | 8/2009 | Barvosa-Carter et al. | |
| 7,673,562 B2 | 3/2010 | Pattekar et al. | |
| 7,755,840 B2 | 7/2010 | Batchko et al. | |
| 7,892,630 B1 | 2/2011 | McKnight et al. | |
| 7,901,524 B1 | 3/2011 | McKnight et al. | |
| 7,905,538 B2 | 3/2011 | Ukpai et al. | |
| 8,180,065 B2 | 5/2012 | Snider | |
| 8,222,799 B2 | 7/2012 | Polyakov et al. | |
| 8,231,563 B2 | 7/2012 | Mauge et al. | |
| 8,240,677 B2 | 8/2012 | Browne et al. | |
| 3,272,392 A1 | 9/2012 | Pattekar et al. | |
| 8,430,810 B2 | 4/2013 | Hassidov et al. | |
| 8,457,325 B2 | 6/2013 | Snider et al. | |
| 8,863,608 B2 | 10/2014 | Fischer et al. | |
| 9,061,118 B2 | 6/2015 | Shoham et al. | |
| 9,308,949 B1 | 4/2016 | Mihelic et al. | |
| 9,764,113 B2 | 9/2017 | Tuval et al. | |
| 9,790,968 B2 | 10/2017 | Yang et al. | |
| 9,919,418 B2 | 3/2018 | Hashimoto | |
| 9,937,966 B1 | 4/2018 | Yoon et al. | |
| 10,058,647 B2 | 8/2018 | Roche et al. | |
| 10,293,718 B1 | 5/2019 | Ilievski et al. | |
| 10,302,586 B2 | 5/2019 | Sun et al. | |
| 10,465,723 B2 | 11/2019 | Ilievski et al. | |
| 10,631,083 B1 | 4/2020 | Gandhi et al. | |
| 10,640,033 B1 | 5/2020 | Gandhi et al. | |
| 10,682,903 B1 | 6/2020 | Gandhi et al. | |
| 10,682,931 B2 | 6/2020 | Rowe et al. | |
| 10,746,206 B1 | 8/2020 | Rowe et al. | |
| 10,749,448 B2 | 8/2020 | Lindsay et al. | |
| 10,797,217 B2 | 10/2020 | Hakkens et al. | |
| 10,946,535 B2 | 3/2021 | Gandhi et al. | |
| 2002/0100888 A1 | 8/2002 | Sharma et al. | |
| 2004/0107829 A1 | 6/2004 | Davis et al. | |
| 2004/0261411 A1 | 12/2004 | MacGregor | |
| 2005/0045480 A1 | 3/2005 | Krumme | |
| 2005/0198904 A1 | 9/2005 | Browne et al. | |
| 2005/0199440 A1 | 9/2005 | Keefe et al. | |
| 2005/0206096 A1 | 9/2005 | Browne et al. | |
| 2006/0038745 A1 | 2/2006 | Naksen et al. | |
| 2006/0147051 A1 * | 7/2006 | Smith | G10K 11/172 381/71.2 |
| 2007/0046074 A1 | 3/2007 | Satta et al. | |
| 2007/0120438 A1 | 5/2007 | Divoux | |
| 2007/0246898 A1 | 10/2007 | Keefe et al. | |
| 2008/0232609 A1 | 9/2008 | Snider | |
| 2009/0086331 A1 | 4/2009 | Gunasekaran et al. | |
| 2009/0115285 A1 | 5/2009 | Najafi et al. | |
| 2009/0255187 A1 | 10/2009 | Alexander et al. | |
| 2010/0090497 A1 | 4/2010 | Beckon | |
| 2010/0172510 A1 * | 7/2010 | Juvonen | G10K 11/17821 381/71.6 |
| 2010/0258362 A1 | 10/2010 | Trimmer | |
| 2011/0188258 A1 | 8/2011 | Tajima | |
| 2012/0234621 A1 | 9/2012 | Syvret et al. | |
| 2012/0287493 A1 | 11/2012 | Kuhlman et al. | |
| 2013/0255815 A1 | 10/2013 | Brinkmann et al. | |
| 2013/0304049 A1 | 11/2013 | Behnke, II et al. | |
| 2013/0318962 A1 | 12/2013 | Joshi et al. | |
| 2014/0109560 A1 | 4/2014 | Ilievski et al. | |
| 2015/0331156 A1 | 11/2015 | Hirsa | |
| 2016/0106620 A1 | 4/2016 | Uno et al. | |
| 2017/0036709 A1 | 2/2017 | Metka et al. | |
| 2017/0080987 A1 | 3/2017 | Morgan | |
| 2017/0150252 A1 | 5/2017 | Trestain et al. | |
| 2017/0240224 A1 | 8/2017 | Gaylard et al. | |
| 2018/0036198 A1 | 2/2018 | Mergl et al. | |
| 2018/0172172 A1 | 6/2018 | Oehler et al. | |
| 2018/0339624 A1 | 11/2018 | Leck | |
| 2019/0023161 A1 | 1/2019 | Sullivan et al. | |
| 2019/0032684 A1 | 1/2019 | Kowalewski et al. | |
| 2019/0059608 A1 | 2/2019 | Yan et al. | |
| 2019/0232822 A1 | 8/2019 | Hintermaier | |
| 2019/0296217 A1 | 9/2019 | Jung et al. | |
| 2019/0312193 A1 | 10/2019 | Pelssers et al. | |
| 2019/0322324 A1 | 10/2019 | Hurst | |
| 2019/0326505 A1 | 10/2019 | Pelssers et al. | |
| 2020/0032822 A1 | 1/2020 | Keplinger et al. | |
| 2020/0066963 A1 | 2/2020 | Johnson et al. | |
| 2020/0120427 A1 * | 4/2020 | Heilemann | G05D 19/02 |
| 2020/0130202 A1 | 4/2020 | Prokhorov et al. | |
| 2020/0132213 A1 | 4/2020 | Gandhi et al. | |
| 2020/0136525 A1 | 4/2020 | Gandhi et al. | |
| 2020/0136526 A1 | 4/2020 | Gandhi et al. | |
| 2020/0156237 A1 | 5/2020 | Tang et al. | |
| 2020/0156314 A1 | 5/2020 | Rowe et al. | |
| 2020/0182269 A1 | 6/2020 | Rowe | |
| 2020/0189469 A1 | 6/2020 | Gandhi et al. | |
| 2020/0216121 A1 | 7/2020 | Gandhi et al. | |
| 2020/0238854 A1 | 7/2020 | Gandhi et al. | |
| 2020/0259426 A1 | 8/2020 | Rowe | |

FOREIGN PATENT DOCUMENTS

| | | | |
|---|---|---|---|
| JP | H11305782 A | 11/1999 | |
| JP | 2007097292 A | 4/2007 | |
| KR | 20050056526 A | 6/2005 | |
| WO | 9716817 | 5/1997 | |
| WO | WO-2008015215 A2 * | 2/2008 | G10K 11/17857 |
| WO | 2009048952 A1 | 4/2009 | |
| WO | 2012135642 A2 | 4/2012 | |
| WO | 2014100573 A2 | 6/2014 | |
| WO | 2017077541 A1 | 5/2017 | |
| WO | 2018175741 A1 | 9/2018 | |

OTHER PUBLICATIONS

Mokry et al., "Noise shielding using active acoustic metamaterials with electronically turnable acoustic impedance," Internoise Conference, pp. 1-9 (2014).

Acome et al., "Hydraulically amplified self-healing electrostatic actuators with muscle-like performance," Science, vol. 359, Issue 6371, pp. 61-65 (2018) (Abstract).

Unknown, "Noise-Absorbing Windows," https://phys.org/news/2007-04-noise-absorbing-windows.html (2007).

Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

Yang et al., "Novel Design and Three-Dimensional Printing of Variable Stiffness Robotic Grippers," Dec. 2016, ASME Journal of Mechanisms and Robotics, vol. 8, p. 061010-1 to 061010-15 (15 pages).

(56) References Cited

OTHER PUBLICATIONS

SMC Tech, "Precision Regulator. Series IR1000/2000/3000", SMC Tech, pp. 713-725 and 1-19, 2015 (53 pages).

* cited by examiner

SOUND-MODULATING WINDOWS

TECHNICAL FIELD

The subject matter described herein generally relates to sound reduction and, more particularly, sound reduction in a vehicle environment.

BACKGROUND

Road sounds and noises produced by a variety of sources, such as wind, contact with the road, and other vehicles, which affects the vehicle cabin. Road noise can provide difficulties for an occupant. Loud noises can be startling or distracting and can create physiological effects, such as an increased heart rate. Further, road noise can affect the occupant's awareness of and ability to respond to road events. Isolation of the vehicle cabin from the road, such as through closed windows and insulation, is one response to road noise. However, isolation from the road must be weighed against the occupant interacting with the road to drive.

SUMMARY

Disclosed herein is a sound-modulating window assembly having a plurality of hydraulic actuators. In one implementation, a sound-modulating window assembly for a vehicle is disclosed. The window assembly can include a window having an edge region, an inner surface; and an outer surface, the inner surface being configured to face a passenger compartment, and the outer surface being configured to face a vehicle exterior. The window assembly can further include one or more sensors configured to receive sensor information in response to one or more sounds. The window assembly can further include a sound modulation assembly. The sound modulation assembly can include a controller configured to deliver one or more inputs to one or more actuating elements based on the sensor information. The sound modulation assembly can further include one or more actuating elements including one or more actuator assemblies, the actuating elements configured to deliver force to at least a portion of the edge region in response to the one or more inputs.

In another implementation, a sound modulation system for controlling a sound-modulating window assembly of a vehicle is disclosed. The sound modulation system can include a sound-modulating window assembly having a window and one or more actuator assemblies, the one or more actuator assemblies being operatively positioned with respect to the window. The sound modulation system can further include one or more processors and a memory communicably coupled to the one or more processors. The memory can store a sound detection module including instructions that when executed by the one or more processors cause the one or more processors to detect one or more sounds using one or more sensors. The memory can further store a classification module including instructions that when executed by the one or more processors cause the one or more processors to compare the one or more sounds to a sound profile to determine one or more selected sounds, and to evaluate the one or more selected sounds for one or more sound parameters. The memory can further store a sound modulation module including instructions that when executed by the one or more processors cause the one or more processors to create a modulation profile corresponding to at least one of the one or more sound parameters, and to activate the one or more actuator assemblies according to the modulation profile to alter one or more dampening characteristics of the window, the modulation profile affecting transmission of the selected sound.

In another implementation, a method for controlling a sound-modulating window assembly is disclosed. The method can include detecting one or more sounds using one or more sensors. The method can further include comparing the one or more sounds to a sound profile to determine one or more selected sounds. The method can further include evaluating the one or more selected sounds for one or more sound parameters. The method can further include creating a modulation profile corresponding to at least one of the one or more sound parameters. The method can further include modulating a sound-modulating window assembly using the modulation profile and the one or more actuators, the modulation profile affecting transmission of the selected sound.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only typical implementations of this disclosure and are therefore not to be considered limiting of its scope. The disclosure may admit to other equally effective implementations.

To facilitate understanding, identical reference numerals have been used, wherever possible, to designate identical elements that are common to the figures. Additionally, elements of one implementation may be advantageously adapted for utilization in other implementations described herein.

DETAILED DESCRIPTION

Figure 1A:
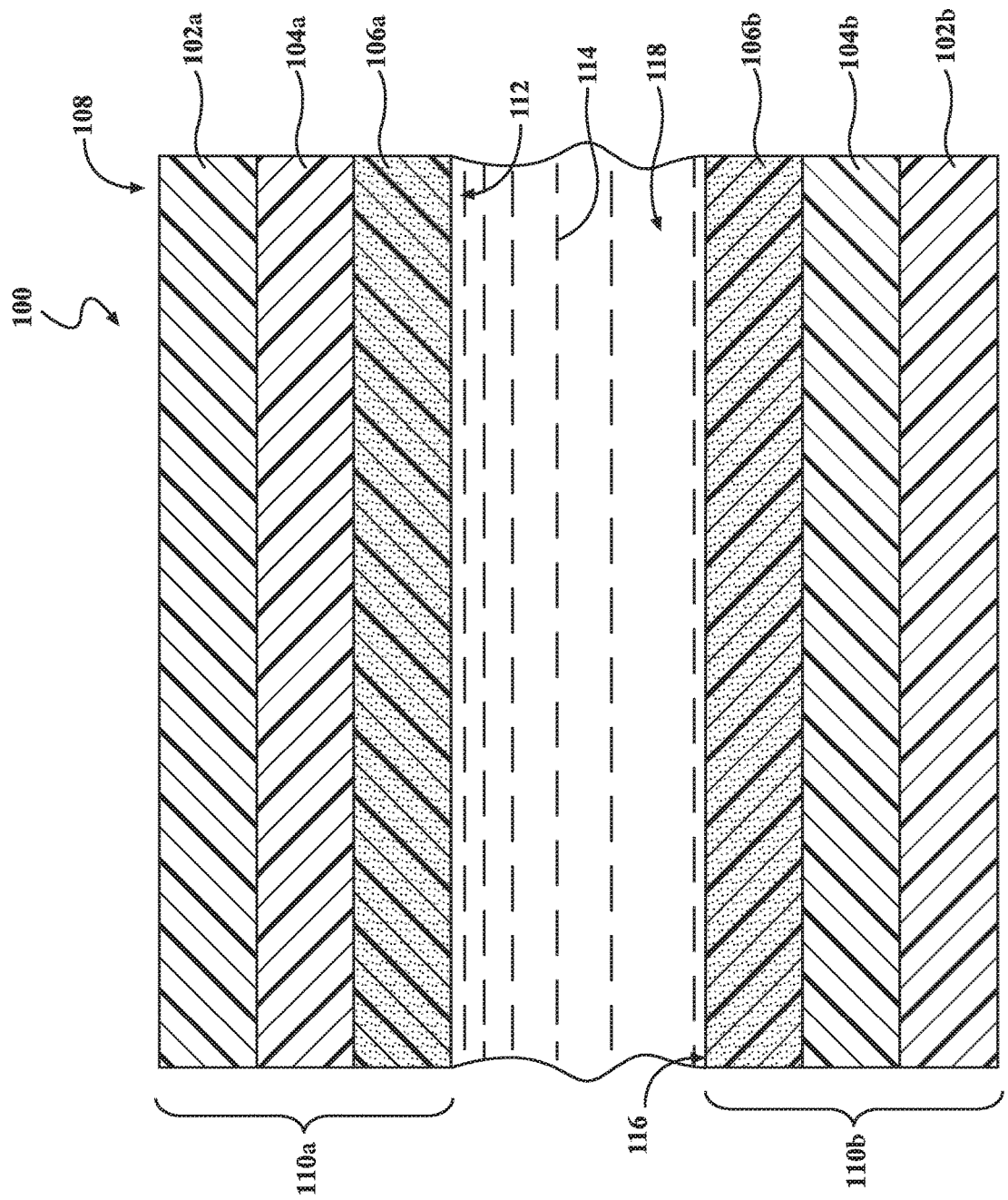
FIGS. 1A-1C are sectional views of an actuator, according to one or more implementations.

Disclosed herein are sound-modulating window assemblies and methods of making and using the same. In one or more implementations, the sound-modulating window assemblies can include a window having an edge region and inner surface and an outer surface. The inner surface can be configured to face a passenger compartment. The outer surface can be configured to face a vehicle exterior, such as when installed as part of a vehicle. The sound-modulating window assemblies, as disclosed herein, can employ a plurality of actuators. The actuators can be positioned in operative connection with the edge region of one or more windows. The actuators can be configured to create or dampen vibration from the windows in correspondence to one or more noise profiles. The modulations produced by the actuators can mimic the wavelength of the incoming noise, based on the one or more noise profiles.

As used herein, the terms "operatively connected" and/or "operative connection" generally refer to any form of connection or association capable of being formed between two or more elements, in light of the functions and/or operations described in the embodiments disclosed herein. In one or more implementations, "operatively connected" can include any form of direct and indirect connections, including connections without direct physical contact. Elements which are described herein as "operatively connected" can, in one or more implementations, be more specifically described as "directly connected", "indirectly connected", "connected", "fluidly connected", "mechanically connected", "electrically connected", "fixably connected", "transiently connected", other forms of connection, or combinations of the above connections, as appropriate for the elements being described. In one or more further implementations, prepositions such as "to", "with", "between", "in parallel", "in series", or combinations thereof, can be added to more clearly describe the organization of the operative connections described herein or exchanged to discuss alternative implementations. Furthermore, "operatively connected" can include unitary physical structures, that is, structures formed from a single piece of material (e.g., by casting, stamping, machining, three-dimensional printing, etc.). All permutations of operative connections described here are expressly contemplated for one or more implementations of this disclosure without further explicit recitation herein.

The sound-modulating window assembly can further include a sensor system. The sensor system can be configured to receive sensor information in response to one or more external sounds. In one implementation, the sensor system can provide sensor input to a sound modulation assembly. The sound-modulating window assembly can include a window connection and a sound modulation assembly. The sound-modulating window assembly can include the one or more actuators, with or without one or more piezoelectric elements, and a controller configured to control the assembly. By modulating (e.g., vibrating and/or dampening) the windows in correspondence to the wavelength, direction, and/or another characteristic of the sound waves, the sound-modulating window assembly is capable of reducing and/or deflecting the incoming sounds to the vehicle cabin. The implementations disclosed herein are described in greater detail with reference to the figures below.

FIG. 1A is a sectional view of an actuator 100, according to one or more implementations. The actuator 100 can be a hydraulic actuator. As will be described herein, the actuator 100 can be configured for operative connection with a surface, engaging a surface, and/or for moving one or more objects. The actuator 100 can be a soft, elastic, and/or flexible actuator. The actuator 100 can have a pliable or semi-pliable body. The actuator 100 can be an electrostatic device capable of displacing and/or affecting the flow of a fluid with the application of electric charge. The application of opposite electric charges can be used to attract two or more conductive elements together into an actuated position. "Actuated position," as used herein, relates to the position of the actuator 100 when the inner surface of the membrane is brought together, such as through electrostatic attraction. In some embodiments, the actuated position can create hydraulic force. In one or more implementations, the actuated position is achieved by delivering an electrical input to the conductive portions of the fluid-impermeable membrane, as described herein. "Relaxed position," as used herein, refers to the position of the actuator 100 when the actuator receives no input from electrostatic attraction and the membrane is substantially at equilibrium with respect to internal forces. In one or more implementations, the relaxed position is the original shape or substantially the original shape of the membrane, such as before delivering or after cessation of the electrical input. The actuator 100 can be capable of changing shape in response to receiving the electrical input, causing fluid pressure to be applied to the portions of the fluid-impermeable membranes 110a and 110b. This fluid pressure can then change the shape of the actuator 100 in relation to the elasticity of the fluid-impermeable membranes 110a and 110b. Thus, the actuator 100 can have at least one relaxed position, which can be maintained in the absence of an electrical input. The electric charge to the actuator 100 can then be delivered, causing the actuator 100 to achieve the actuated position due to electrostatic attraction and hydraulic forces. When the charge is removed, the actuator 100 can then return to substantially one of the one or more relaxed positions.

As shown here, the actuator 100 can include fluid-impermeable membranes 110a and 110b and a dielectric fluid 114. The fluid-impermeable membranes 110a and 110b can be composed of layers, such as external insulating portions 102a and 102b, conductive portions 104a and 104b, and internal insulating portions 106a and 106b. "Portion," as used herein, relates to one or more components which can form a layer, a portion of a layer, or structure in the fluid-impermeable membranes 110a and 110b of the actuator 100. The portions can have non-uniform coverage or thickness, as desired. The portions above are described as a single, uniform element or layer for simplicity purposes. However, the portions can include one or more of any of the layers, portions of layers, or variations as disclosed herein. As such, the portions may only partially extend the dimensions of the fluid-impermeable membranes 110a and 110b. As well, the portions of the fluid-impermeable membranes 110a and 110b can meet to form a seal, such that a chamber or compartment 118 is formed in the inner region of the fluid-impermeable membrane 110a and 110b. It should be noted that internal insulating portions 106a and 106b can be the same structure, or they can be separate structures. Further, external insulating portions 102a and 102b can be separate portions, or they can be the same structure.

The fluid-impermeable membranes 110a and 110b, or components thereof (e.g., the external insulating portions 102a and 102b, the conductive portions 104a and 104b, and/or the internal insulating portions 106a and 106b), can be flexible and/or elastic at one or more points and/or across one or more portions of the fluid-impermeable membranes 110a and 110b. In one or more implementations, the fluid-impermeable membranes 110a and 110b, or components thereof, are completely flexible and elastic. In another implementation, the fluid-impermeable membranes 110a and 110b are flexible across the entirety but only elastic across one or more strips of the fluid-impermeable membranes 110a and 110b. In another implementation, the fluid-impermeable membranes 110a and 110b are flexible and elastic at the external insulating portion 102a and 102b and the internal insulating portions 106a and 106b, but neither flexible nor elastic at the conductive portions 104a and 104b. One skilled in the art will understand the variety of combinations of flexibility, elasticity, and positioning of the portions of the fluid-impermeable membranes 110a and 110b, without further explicit recitation of specific examples herein.

The external insulating portion 102a and 102b can form an exterior surface 108 of the fluid-impermeable membranes 110a and 110b. In one or more implementations, the external insulating portion 102a and 102b can form the entire exterior surface of the fluid-impermeable membranes 110a and 110b. The external insulating portion 102a and 102b can be flexible and/or elastic at one or more portions. In one or more implementations, the external insulating portions 102a and 102b are entirely flexible and elastic. In another implementation, the external insulating portion 102a and 102b can have interspersed regions of flexibility, or flexibility and elasticity. The interspersed regions can be in a pattern or random, as desired. The external insulating portion 102a and 102b can form an interface with the surface of one or more inner layers, such as the internal insulating portions 106a and 106b and/or the conductive portions 104a and 104b.

The external insulating portion 102a and 102b can include a polymer, an elastomeric polymer (elastomer) or both. The use of a plurality of different encapsulating elastomers and/or polymers of varying degrees of softness and hardness can be employed. The polymers used in the implementations described herein can further include the addition of a plasticizer, such as phthalate esters. The polymers or elastomers may be natural or synthetic in nature. Examples of elastomers usable as part of the external insulating portion 102a and 102b can include an insulating elastomer, such as nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, silicone rubber, or combinations thereof. The external insulating portion 102a and 102b can be described with regards to electrical insulation. The electrical insulation of the external insulating portion 102a and 102b can be described in relation to the dielectric constant, or κ value, of the material. The term "elastomer," as used herein, means a material which can be stretched by an external force at room temperature to at least twice its original length, and then upon immediate release of the external force, can return to its original length. Room temperature can generally refer to a temperature in a range of from about 20° C. to about 25° C. Elastomers, as used herein, can include a thermoplastic, and may be cross-linked or thermoset.

The conductive portions 104a and 104b can be largely or entirely internal elements of the fluid-impermeable membranes 110a and 110b. The conductive portions 104a and 104b can be conductive to electrical current, such that the conductive portion creates an electric field. In one or more implementations, the conductive portions 104a and 104b can be formed between the external insulating portion 102a and 102b and the internal insulating portions 106a and 106b. In another implementation, the conductive portions 104a and 104b can include hydrogels. The conductive portions 104a and 104b can further include a polymer, an elastomeric polymer (elastomer) or both. Examples of elastomers usable as part of the conductive portions 104a and 104b can include nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof. The conductive portions 104a and 104b can be composed or further include a conductive material, such as an electrically conductive dopant. Electrically conductive dopants can include silver, gold, platinum, copper, aluminum, or others. In further implementations, the conductive portions 104a and 104b can include inks and adhesives, for the purpose of flexibility and/or conductivity.

The internal insulating portions 106a and 106b can form an interior surface 112 of the fluid-impermeable membranes 110a and 110b. The internal insulating portions 106a and 106b can be composed of a material similar to that of the external insulating portion 102a and 102b. In one or more implementations, the internal insulating portions 106a and 106b can include an insulating elastomer, such as nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof. In one or more implementations, the internal insulating portions 106a and 106b can include polymers and elastomers having a high electric breakdown voltage and not electrically conductive. The internal insulating portions 106a and 106b can further include a protective layer 116. The protective layer 116 can be formed between the internal insulating portions 106a and 106b and a dielectric fluid 114, as shown in FIG. 1. In some arrangements, the protective layer 116 can form a part of the interior surface 112. The protective layer 116 can be uniform or vary in size or composition. Further, the protective layer 116 can be non-conductive and/or resistant to corrosion. In one or more implementations, the protective layer 116 is a flexible and corrosion resistant plastic, such as fluorinated ethylene propylene (FEP).

The fluid-impermeable membranes 110a and 110b can be sealed at one or more edges, such that the fluid-impermeable membranes 110a and 110b can form a compartment 118. However, in some implementations, the fluid-impermeable membranes 110a and 110b (or portions thereof) may not be separate structures but instead are a unitary structure. The chamber can hold the dielectric fluid 114. The dielectric fluid 114 can be a fluid that is resistant to electrical breakdown and/or provides insulation. In one or more implementations, the dielectric fluid 114 can prevent arcing between one or more opposing layers (e.g., the opposing conductive portions 104). The dielectric fluid 114 can be a lipid-based fluid, such as a vegetable oil-based dielectric fluid. The dielectric fluid 114 can be ethylene glycol. The dielectric fluid 114 can have an associated dielectric constant, or κ value.

Figure 1B:
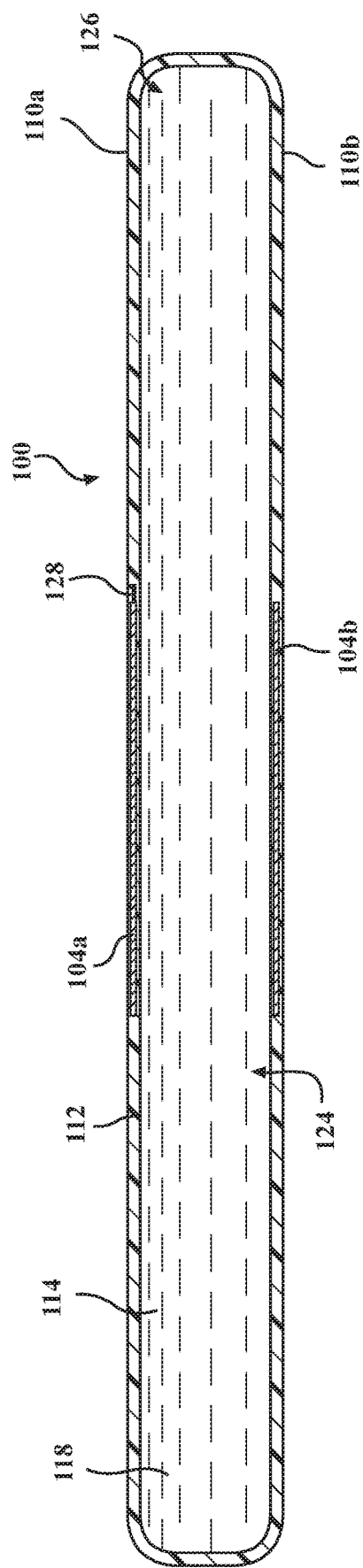
Figure 1C:
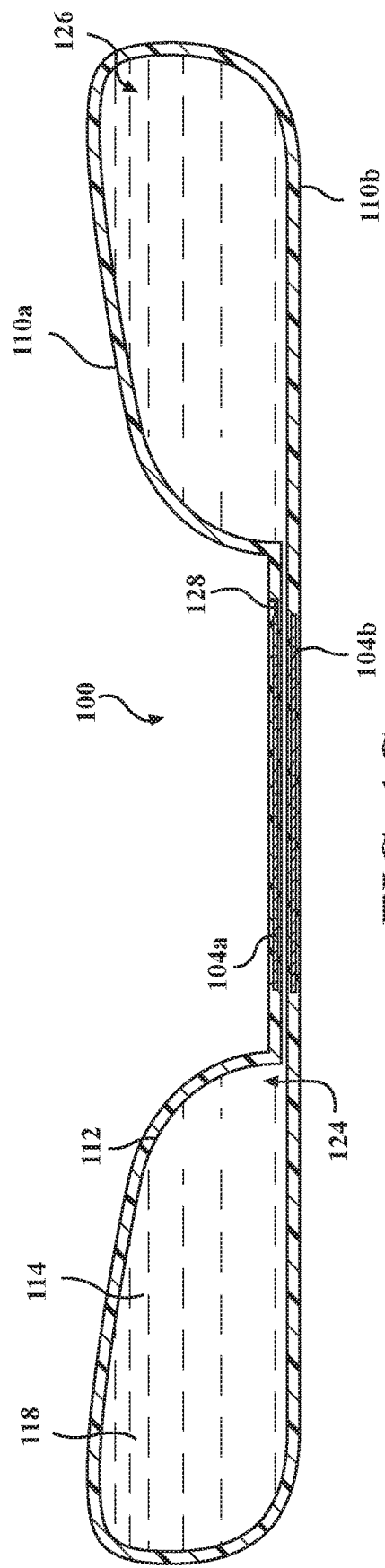

FIGS. 1B and 1C depict side cross-sectional views of the actuator 100, according to one or more implementations. FIG. 1B shows the actuator 100 in a relaxed position and FIG. 1C shows the actuator 100 in an actuated position. The side views depict the actuator 100 as an operating unit, according to one or more implementations. In one or more implementations, the fluid-impermeable membranes 110a and 110b, described with reference to FIG. 1B, are disposed opposite to one another with the edges sealed to form the compartment 118. The internal insulating portions 106a and 106b can form the interior surface 112 of the compartment 118. The dielectric fluid 114 can be disposed inside of the compartment 118. The compartment 118 can include a central region 124 and an edge region 126.

The compartment 118 can hold the dielectric fluid 114. The dielectric fluid 114 can be a fluid that is resistant to electrical breakdown and/or provides insulation. In one or more implementations, the dielectric fluid 114 can prevent arcing between one or more opposing layers (e.g., the opposing conductive portions 104). The dielectric fluid 114 can be a lipid-based fluid, such as a vegetable oil-based dielectric fluid. In one implementation, the dielectric fluid 114 can be ethylene glycol. The dielectric fluid 114 can have a low dielectric constant, or κ value. The central region 124 is a region of the compartment 118 which is in the center of the actuator 100. The central region 124 can include the conductive portions 104a and 104b. The edge region 126 is a region of the compartment 118 which is at the edge of the actuator 100.

One or more electrodes 128 can be operatively connected with the conductive portions 104a and 104b. The electrodes 128 can be flexible or malleable, such as being capable of deforming or deflecting without compromising mechanical or electrical performance. Generally, electrodes 128 as used herein can be of a shape and material such that they can supply a suitable voltage to or receive a suitable voltage from the conductive portions 104a and 104b. The voltage delivered through the electrodes 128 can be either constant or varying over time. In one or more implementations, the electrodes 128 can adhere to a surface of the fluid-impermeable membranes 110a and 110b. Electrodes 128 can be pliable and conform to the changing shape of the fluid-impermeable membranes 110a and 100b. In further implementations, the electrodes 128 can be formed in the fluid-impermeable membrane 110a and 110b. Correspondingly, one or more implementations can include pliable electrodes that conform to the shape of the fluid-impermeable membrane 110a and 110b which they are attached to or positioned within. The electrodes 128 can be applied to a portion of the fluid-impermeable membrane 110a and 110b and define an active area according to their geometry.

When an electric charge is delivered to the conductive portions 104a and 104b, the conductive portions 104a and 104b can create an electric field. The electric fields can be oppositely charged. As a result, the corresponding electric fields of the conductive portions 104a and 104b can attract each other and the corresponding portions of the fluid-impermeable membranes 110a and 110b toward one another, an event which may be referred to herein as "contracting" or "contraction." Such a condition is shown in FIG. 1C. The contraction of the fluid-impermeable membranes 110a and 110b can create a hydraulic force in the central region 124 forcing the dielectric fluid 114 into the edge region 126. The fluid-impermeable membrane 110a and 110b can be elastic and, thus, the fluid-impermeable membranes 110a and 110b can expand in the edge region 126. The overall height of the actuator 100 can be greater in the edge region 126 in the actuated position relative to the relaxed position. This hydraulic force in the edge region 126 can then be delivered to one or more nearby objects, such as a portion of a vehicle. Alternatively or in addition, the expanded edge region 126 can physically engage one or more nearby objects.

Figure 2A:
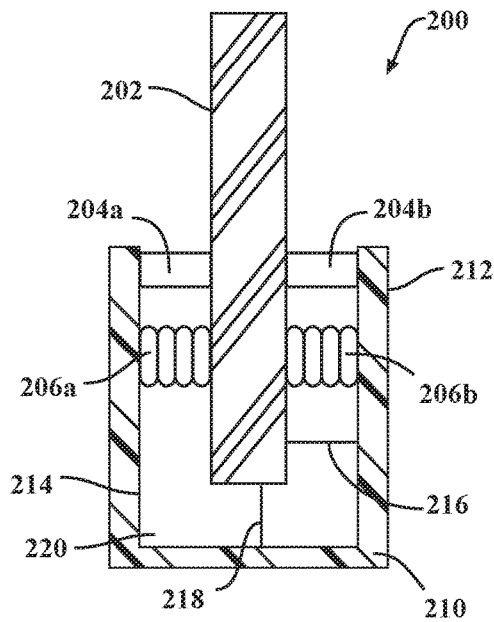
FIGS. 2A-2C are sectional views of a portion of a sound modulation assembly, according to one or more implementations.
Figure 2B:
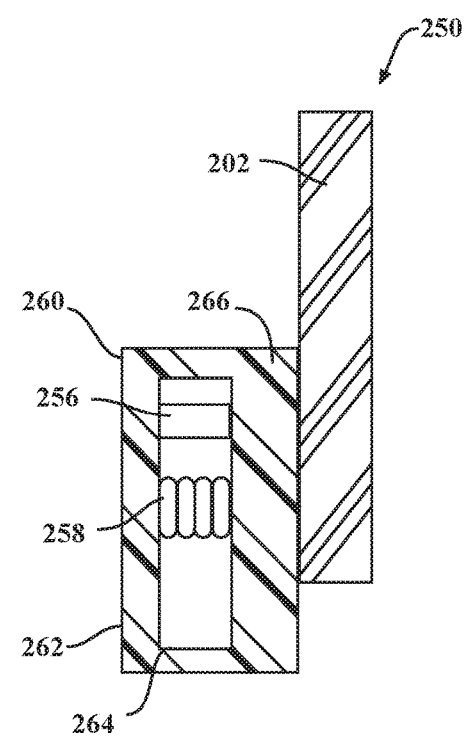
Figure 2C:
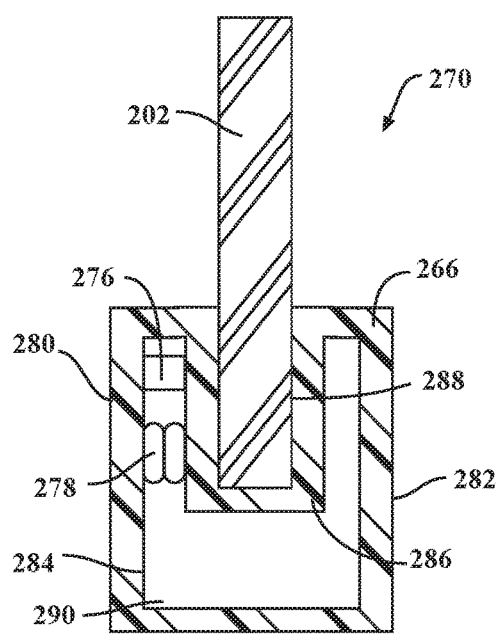

FIGS. 2A-2C depict a sectional view of various implementations of a sound modulation assembly, according to one or more examples. The sound modulation assembly, as described herein, can include one or more elements which can responsively change a characteristic of the window assembly, such as in response to external sound or noise. In one implementation, the sound modulation assembly can include one or more of a retaining element, a piezoelectric element, a hydraulic actuator, or combination thereof. The sound modulation assembly can produce and/or resist vibrations which can cancel and/or dampen the sounds or noises delivered into the vehicle cabin from one or more external sources. "Sound" as used herein generally includes both desirable and undesirable sounds. Though not intended to be limiting, undesirable sounds may also be referred to herein as "noise."

FIG. 2A depicts a sectional view of a sound modulation assembly 200, according to one or more implementations. The sound modulation assembly 200 can be configured to receive a window 202. The sound modulation assembly 200 can include a housing 210. In one or more implementations, the housing 210 can form a compartment 220. The sound modulation assembly 200 can further include piezoelectric elements 204a and 204b and actuator assemblies 206a and 206b. The piezoelectric elements 204a and 204b and the actuator assemblies 206a and 206b can be positioned within the compartment 220. The sound modulation assembly 200 can receive sensor information about one or more sounds from a sensor system. The sound modulation assembly 200 can then cause the piezoelectric elements 204a and 204b and/or the actuator assemblies 206a and 206b to vibrate the window 202 and/or alter the dampening characteristics of the window 202, based on the sensor information.

The housing 210 can be a rigid or semi-rigid element forming a barrier around one or more elements of the sound modulation assembly 200. The housing 210 can form the exterior portion of the sound modulation assembly 200. The housing 210 can be composed of a variety of materials, such as metals, polymers, alloys, ceramics, or combinations thereof. In one implementation, the housing 210 can be composed of a plastic, a rubber, an elastomer, or combinations thereof. The housing 210 can be a three-dimensional shape including all primary shapes or combinations thereof such that the housing 210 can enclose the desired elements. In one implementation, the housing 210 can be a substantially square or substantially rectangle shape with an opening to receive an edge portion of the window 202.

The housing 210 can have an exterior surface 212 and an interior surface 214. The exterior surface 212 can be the outer boundary of the housing 210 and can contact one or more elements of the vehicle. In one or more implementations, the exterior surface 212 can be defined by the housing 210, a surface coating, or combination of materials the same or different from the housing 210. In one implementation, the housing 210 and/or the exterior surface 212 can be composed of rubber. The exterior surface 212 can be a generally flat surface. In one implementation, the exterior surface 212 can form multiple surfaces. As shown in FIG. 2A, the exterior surface 212 can form three surfaces. The exterior surface 212 can be one or more services that are substantially parallel, substantially perpendicular, or any angle in between, as compared to one another. As used herein, the term "substantially" includes exactly the term it modifies and slight variations therefrom (e.g., within normal manufacturing tolerances, within about 10 percent (or degrees or other units) or less, within about 5 percent or less, within about 4 percent s or less, within about 3 percent or less, within about 2 percent or less, or within about 1 percent or less).

The interior surface 214 can be the inner boundary of the housing 210 and can form the compartment 220. The interior surface 214 can have one or more elements which are substantially similar to the exterior surface 212. The interior surface 214 can be configured to receive at least a portion of the window 202, which may be referred to as a window connection. The interior surface 214 can include one or more shapes or protrusions to facilitate vibration and/or damping control of the window 202. In one or more implementations, the interior surface 214 can include one or more sealing elements, such that the infiltration of debris, moisture, and/or other undesired substances into the compartment 220 can be minimized.

One or more elements of the sound modulation assembly 200 can be located within the compartment 220. The compartment 220, as defined by the interior surface 214 of the housing 210, can hold one or more elements of the sound modulation assembly 200. As shown in FIG. 2A, the compartment 220 can hold the piezoelectric elements 204a and 204b and the actuator assemblies 206a and 206b. The compartment 220 can maintain a distance between the one or more elements held within the compartment 220. The distance between the one or more elements can allow the one or more elements to act independently of one another such as to provide vibration, dampening, or other elements of the implementations described herein. As shown in FIG. 2A, the compartment 220 can include a vertical distance 218 and a horizontal distance 216 between the interior surface 214 and the window 202.

In one or more implementations, the sound modulation assembly 200 can include one or more actuating elements. Actuating elements, as used herein, can refer to any element capable of creating movement in response to an input. One or more implementations the actuating elements can include the piezoelectric elements 204a and 204b, the actuator assemblies 206a and 206b, or other elements capable of creating movement or vibration. The actuating elements can be positioned with respect to a wall or other surface, such as the interior surface 214 of the compartment 220. The actuating elements can be configured to actuate in series or parallel, such as a series of piezoelectric elements, a series of actuators in an actuator assembly, or combinations thereof.

The sound modulation assembly 200 can further include the one or more piezoelectric elements, such as the piezoelectric elements 204a and 204b. The piezoelectric elements 204a and 204b can be of a variety of materials (e.g., crystalline) which respond with an exertion of force based on an electrical input and/or respond to mechanical stress (e.g., an exertion of force) by producing electrical energy. Examples of materials which act as piezoelectric elements can include Berlinite, quartz, topaz, barium titanate, lead zirconate titanate, and others. The one or more piezoelectric elements 204a and 204b can be a stack or array of a plurality of piezoelectric elements. The piezoelectric elements 204a and 204b can be disposed in contact with the window 202. In one implementation, the piezoelectric elements 204a and 204b can vibrate in response to receiving an electrical input. Such vibration, in turn, can cause the window 202 to vibrate. Further, the piezoelectric elements 204a and 204b can be of a variety of shapes and sizes such that they can convey the vibration response to the window 202. The shape of the piezoelectric elements 204a and 204b can be any primary shape or combinations thereof, such as a square, sphere, and others.

The sound modulation assembly 200 can further include the one or more actuator assemblies 206a and 206b. The one or more actuator assemblies 206a and 206b can be composed of one or more actuators, such as the actuators 100 described with reference to FIGS. 1A-1C. As shown in FIG. 2A, the one or more actuator assemblies 206a and 206b can be composed of a stack of the one or more actuators 100, such as four (4) actuators 100. Further, the one or more actuator assemblies 206a and 206b can be configured in series or parallel. Shown here, the one or more actuator assemblies 206a and 206b are depicted as a series of actuators, with the one or more actuator assemblies 206a and 206b functioning in parallel and/or in series. The one or more actuator assemblies 206a and 206b can deliver the actuation force of the actuators 100 in a sequential or a combinatorial manner.

The one or more actuator assemblies 206a and 206b can provide vibration, dampening, and/or other effects such that sound or noise directed at or impinging upon the window 202 is mitigated. Thus, the transmission of external sounds into a vehicle cabin are reduced. In one or more implementations, the one or more actuator assemblies 206a and 206b can be actuated such that sounds are dampened at the window 202. In one or more arrangements, the one or more actuator assemblies 206a and 206b can be described as being in a doughnut shape. However, any shape of actuator for the actuator assembly 206a and 206b can be used, including combinations of shapes. In one or more implementations, the components of the sound modulation assembly 200 which provide vibration, dampening, and/or other noise mitigation effects can be referred to as an "active support." In one implementation, the piezoelectric elements 204a and 204b and the actuator assemblies 206a and 206b can be referred to as an active support.

FIG. 2B depicts a sound modulation assembly 250, according to one or more implementations. The sound modulation assembly 250 can diminish noise from the exterior of the vehicle cabin by providing vibration and/or dampening to reduce the sound entering through the window 202. As described above, the sound modulation assembly 250 can provide vibration or dampening with consideration of the frequency, wavelength, and/or amplitude of the incoming sound or noise. The sound modulation assembly 250 can include a housing 260. The sound modulation assembly 250 can further include one or more piezoelectric elements, such as piezoelectric element 256. The sound modulation assembly 250 can further include one or more actuator assemblies, such as actuator assembly 258. The piezoelectric element 256 and the actuator assembly 258 can be substantially similar to the one or more actuator assemblies 206a and 206b and the piezoelectric elements 204a and 204b described with reference to FIG. 2A.

The housing 260 can include an exterior surface 262, an interior surface 264, and a support region 266. The exterior surface 262 and the interior surface 264 can be substantially similar to the exterior surface 212 and the interior surface 214, described with reference to FIG. 2A. The support region 266 can contact the window 202 and provide support to the window 202 during vibration or dampening. As shown here, the support region 266 can be in contact with a portion of a surface of the window 202, such as the edge region of the window 202. In this implementation, the actuator assembly 258 and/or the piezoelectric element 256 can vibrate or compress the window 202 against the support region 266. In one or more implementations, vibration or compressions can be transmitted to the window 202 through the support region 266. As above, the vibrations or compressions can correspond to the wavelength, amplitude, and/or frequency of one or more incoming sound or noise sources. In this way, sound or noises of the appropriate wavelength, amplitude, and/or frequency can be mitigated or prevented from entering the vehicle cabin.

FIG. 2C depicts the sound modulation assembly 270, according to one or more implementations. The sound modulation assembly 270 can diminish noise from the exterior of the vehicle cabin by providing vibration and/or dampening to reduce one or more sounds or noises entering the vehicle cabin, such as through the window 202. As described above, the sound modulation assembly 270 can provide vibration or dampening with consideration of the frequency, wavelength, and/or amplitude of the incoming sound or noise. The sound modulation assembly 270 can include a housing 280. As shown here the housing 280 can be an enclosed housing. The sound modulation assembly 270 can further include one or more piezoelectric elements, such as piezoelectric element 276. The sound modulation assembly 270 can further include one or more actuator assemblies, such as actuator assembly 278. The piezoelectric element 276 and the actuator assembly 278 can be substantially similar to the one or more actuator assemblies 206a and 206b and the piezoelectric elements 204a and 204b described with reference to FIG. 2A.

The housing 280 can include an exterior surface 282, an interior surface 284, and a support region 286. The interior surface 284 of the housing 280 can enclose a compartment 290. The exterior surface 282 in the interior surface 284 can be substantially similar to the exterior surface 212 and the interior surface 214, described with reference to FIG. 2A. The support region 286 can form a recess 288 which supports the window 202 and surrounds the edge region of the window 202. In this way, the support region 286 can provide further dampening to sound or noise. As shown here, the support region 286 can be in contact with a portion of one or more surfaces of the window 202, such as the edge region of the window 202. In this implementation, the actuator assembly 278 and/or the piezoelectric element 276 can compress and/or vibrate the window 202 via the support region 286. As above, the vibrations or compressions can correspond to the wavelength, amplitude, and/or amplitude of one or more incoming sound or noise sources. In this way, the sound modulation assembly 270 can respond to sound or noises of a specified wavelength, amplitude, and/or frequency. As such, the sound modulation assembly 270 can mitigate or prevent the sound or noise from entering the vehicle cabin.

Each of the elements described herein, with relation to the of the sound modulation assemblies 200, 250, and 270, are shown in specific position and orientation with relation to one another. However, it is understood that the specific positioning or quantity of any element of the of the sound modulation assemblies 200, 250, and 270 is not necessary. As such, the piezoelectric elements and the actuator assemblies, described above with reference to FIGS. 2A-2C, can be duplicated and/or positioned in any orientation with reference to one another or other elements of the sound modulation assemblies 200, 250, and 270. Further, the housing, compartments or other components, can include any variety of shapes or sizes, as desired.

Thus, the sound modulation assembly described herein can provide numerous benefits. The sound modulation assemblies, depicted in sound modulation assembly 200, 250, 270, can receive an input regarding a sound or noise, such as from the exterior environment of the vehicle and/or from within the vehicle, and respond with vibration and/or dampening. The vibration and/or dampening from the sound modulation assembly can be used to mitigate such sound or noise. Thus, drivers and/or passengers in the vehicle cabin can be more comfortable in noisy environments. Further, the driver can be more capable of response, such as when dealing with emergency vehicles.

Figure 3A:
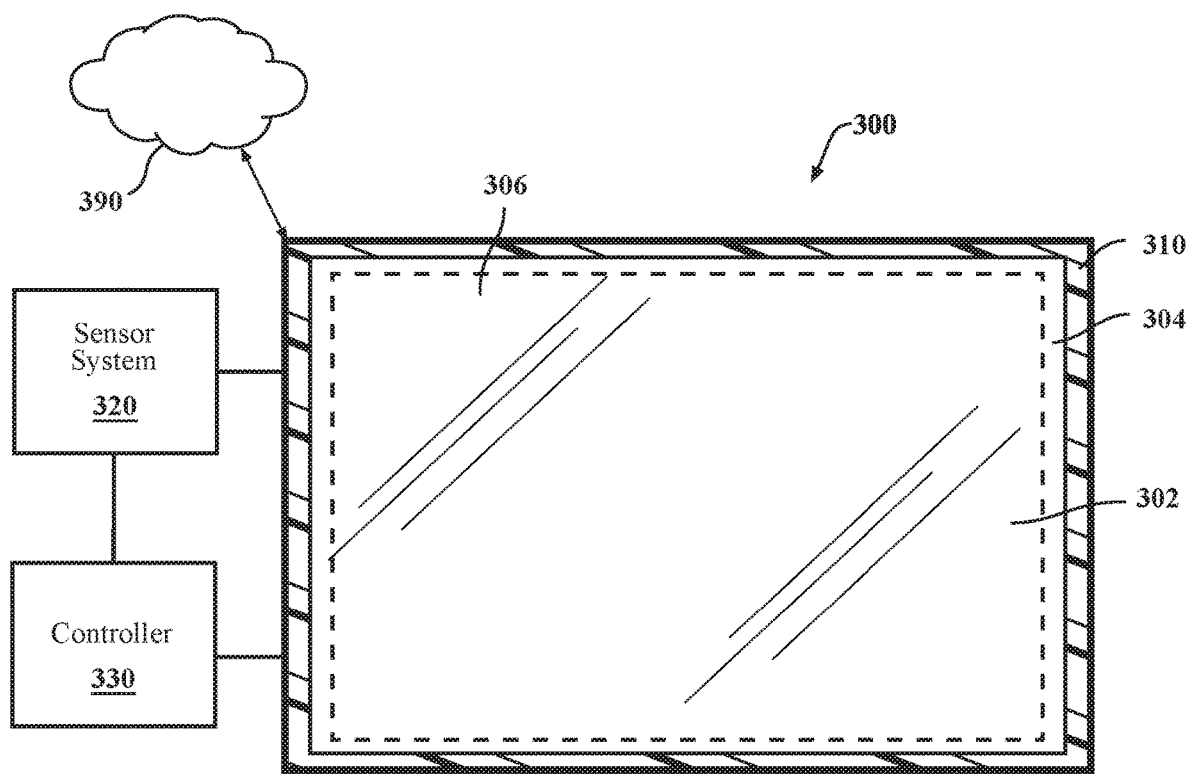
FIGS. 3A and 3B are views of a sound-modulating window assembly, according to one or more implementations.
Figure 3B:
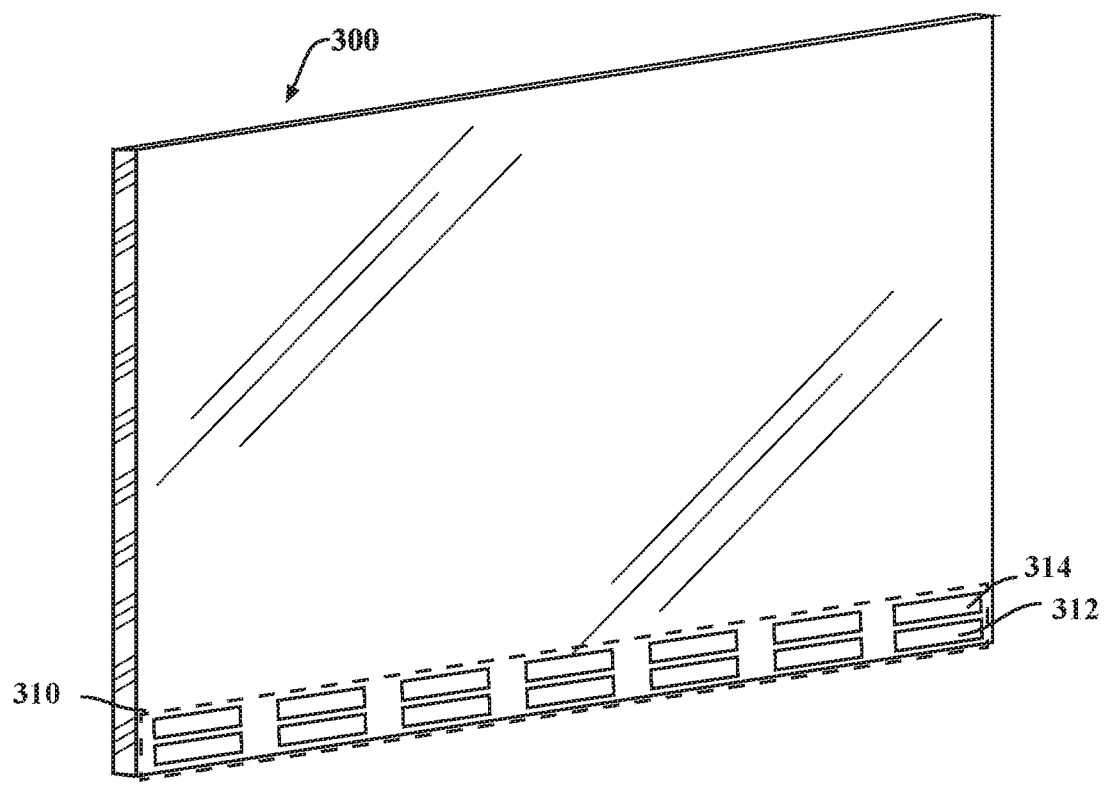

FIGS. 3A and 3B depict a sound-modulating window assembly 300, according to one or more implementations. FIG. 3A depicts a front view of a sound-modulating window assembly 300, according to one or more implementations. FIG. 3B depicts an orthographic sectional view of the sound-modulating window assembly 300, according to one or more implementations. The sound-modulating window assembly 300 can comprise one or more elements capable of reducing, mitigating, or preventing exterior sounds, such as exterior noises, or portions thereof from entering the vehicle cabin. The sound-modulating window assembly 300 can include a window 302, sound modulation assembly 310, a sensor system 320, and a controller 330. The sound modulation assembly 310 can act in conjunction with the window 302 to create a respective vibration and/or dampening, which affects the incoming sound as appropriate or as desired.

The window 302 can be a substantially stiff glass panel (or other suitable material) to reduce or limit flexing of the window panel during operation of the sound modulation assembly 310. The window 302 may be a transparent, semitransparent, or translucent element. In further implementations, the window 302 may be opaque or nontransparent. In yet further implementations, the window 302 may be a nontraditional window, such as a display which provides a real-time view of an exterior environment. The term "window" is not intended to be limiting of possible implementations which may be manipulated by the sound modulation system, through or in conjunction with the controller 330, as described herein. The window 302 may have an edge region 304 and an interior region 306. The edge region 304 can be an imaginary range around the window 302 which indicates the portion of the window 302 which can operatively connect with the sound modulation assembly 310. The interior region 306 can be the central portion of the window 302 as bounded by the edge region 304.

The sound-modulating window assembly 300 can further include the sound modulation assembly 310. The sound modulation assembly 310 can be substantially similar to the sound modulation assembly 200, 250, and 270, described with reference to FIGS. 2A-2C, but other arrangements are possible. The sound modulation assembly 310 can connect with the edge region 304 at one or more portions, such as connecting with the entirety of the edge region 304. The sound modulation assembly 310 can receive instructions or input from the sensor system 320 and/or the controller 330 to control vibration at the window 302 and/or sounds entering through the window 302. In one or more implementations, the controller 330 can include or be in communication with the sound modulation assembly 310 or components thereof, as described herein.

An orthographic sectional view of the sound modulation assembly 310 in operative connection with the window 302 is depicted in FIG. 3B, according to one or more implementations. As shown, a plurality of actuator assemblies 312 and a plurality of piezoelectric elements 314 can be positioned along the sound modulation assembly 310. The plurality of actuator assemblies 312 and the plurality of piezoelectric elements 314 can be substantially similar to the actuator assemblies 206a and 206b and piezoelectric elements 204a and 204b, described with reference to FIG. 2A. In one or more implementations, actuator assemblies 312 can act in unison or independently to control vibration at one or more portions of the window 302. In one or more further implementations, piezoelectric elements 314 can act in unison or independently to control vibration at one or more portions of the window 302. As well, the actuator assemblies 312 and the piezoelectric elements 314 can act in unison or independently control vibration at one or more portions of the window 302, including combinations of interaction including groups comprising one or more of each of the actuator assemblies 312 and the piezoelectric elements 314.

The sound-modulating window assembly 300 can further include the sensor system 320. The sensor system 320 can comprise one or more sensors capable of detecting sounds from the environment. The sensor system 320 can further be configured to separate and analyze the sounds to determine sound parameters, such as wavelength, amplitude, period, frequency, power, intensity, propagation speed, and others which provide information about the sounds received by the vehicle. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 320 includes a plurality of sensors, the sensors can function independently from each other. Alternatively, two or more of the sensors can work in combination with each other. In such a case, the two or more sensors can form a sensor network. The sensor system 320 and/or the one or more sensors can be operably connected to one or more processors, one or more data stores, and/or another element of a vehicle. The sensor system 320 can acquire data of at least a portion of the external environment of the vehicle.

The sensor system 320 can include any suitable type of sensor. Various examples of different types of sensors will be described herein. However, it will be understood that the implementations are not limited to the particular sensors described. The sensor system 320 can include one or more microphones, such as dynamic microphones, condenser microphones, pressure microphones, random incidence microphones, or others. Further, the sensor system 320 can use sensors which are not traditionally used for sensing sound or sound parameters, such as vibrational sensors, piezoelectric sensors, motion sensors, and/or other suitable sensors. The sensors of the sensor system 320 can be configured to detect, and/or sense one or more characteristics of the sounds received by the vehicle or vehicle events (e.g., speed) that can affect the sounds as received. The sensors of the sensor system 320 can be configured to detect, and/or sense one or more characteristics of the sounds external to the vehicle and/or within the vehicle. The sensors can be provided in any suitable location on the vehicle.

In further implementations, the actuator assemblies 312 of the sound modulation assembly 310 can provide sensor input as part of the sensor system 320. In some arrangements, the actuator assemblies 312 can have a capacitance response when stretched or contracted. As sound passes through the actuator assemblies 312, the actuator assemblies 312 can provide an electrical response to the vibrations. The electrical response can be detectable and such detection can provide information regarding the sounds received. Therefore, in some implementations, the actuator assemblies 312 of the sound modulation assembly 310 can act separately or in conjunction with other sensors of the sensor system 320 provide a more robust representation of the incoming and outgoing sound.

The sound-modulating window assembly 300 can further include a controller 330. The controller 330 can be a system which includes one or more modules, and/or one or more devices capable of or configured to control the sound modulation assembly 310. In one implementation, the controller 330 can include a sound modulation system and a computing device, described more fully below with reference to FIGS. 4 and 5. The controller 330 can be in operative connection with or in communication with the sensor system 320 and/or the sound modulation assembly 310 through a network 390. The controller 330 can use the sound or the sound parameters to respond to the sound. The controller 330 can deliver the response to the sound through the sound modulation assembly 310, creating vibrations, combinations of vibrations, dampening, and/or selectively variable dampening designed to affect one or more sounds. In one or more implementations, "affect" can include enhancing, diminishing, or combinations thereof. The response from the controller 330 can regulate one or more of the actuator assemblies 312 and/or the piezoelectric elements 314 to create zones of vibration and/or dampening. The zones of vibration and/or dampening can be used to mitigate or prevent different sounds from a different direction from being received by an occupant of the vehicle cabin.

The sound-modulating window assembly 300 can receive information about one or more sounds and provide a response to control the transmission of the sounds to the vehicle cabin. By controlling or preventing the transmission of sounds, the sound-modulating window assembly 300 can provide numerous benefits to the occupants of the vehicle cabin. The sound-modulating window assembly 300 can increase the comfort of the occupants in response to road noises, such as vehicle movement, honking, construction, or others. Further, the sound-modulating window assembly 300 can selectively minimize sounds, allowing the occupants to respond better to the environment, such as hearing a distant emergency vehicle.

Further, when the noise cancellation is turned ON in only some areas of the vehicle, the driver can detect which direction the negative white-noise (or absence of sound) is located with respect to the inside of the vehicle. The negative white-noise can then draw the driver's attention. By cancelling the noise, accompanied with an informed tone, beep, voice alerts, or others, the driver can be alerted and/or informed that a warning is being transmitted and at which direction the object/obstacle is approaching. As well, the negative white-noise can provide a negative warning (e.g., turning ON in-vehicle noise cancellation) so the driver will recognize outside noise has been dampened on the inside of the vehicle. For vehicles equipped with white-noise cancellation or other sound dampening technology, the absence of sound will draw the driver's attention. By cancelling the noise on a particular side of the cabin, the driver can become aware of from where the warning is coming. The implementations described herein specifically contemplate the use of an informed tone, beep or voice alert coupled with the absence of sound to issue a warning to the driver for such vehicle systems as object detection, navigation, lane departure, parking assist, or others as desired.

Figure 4:
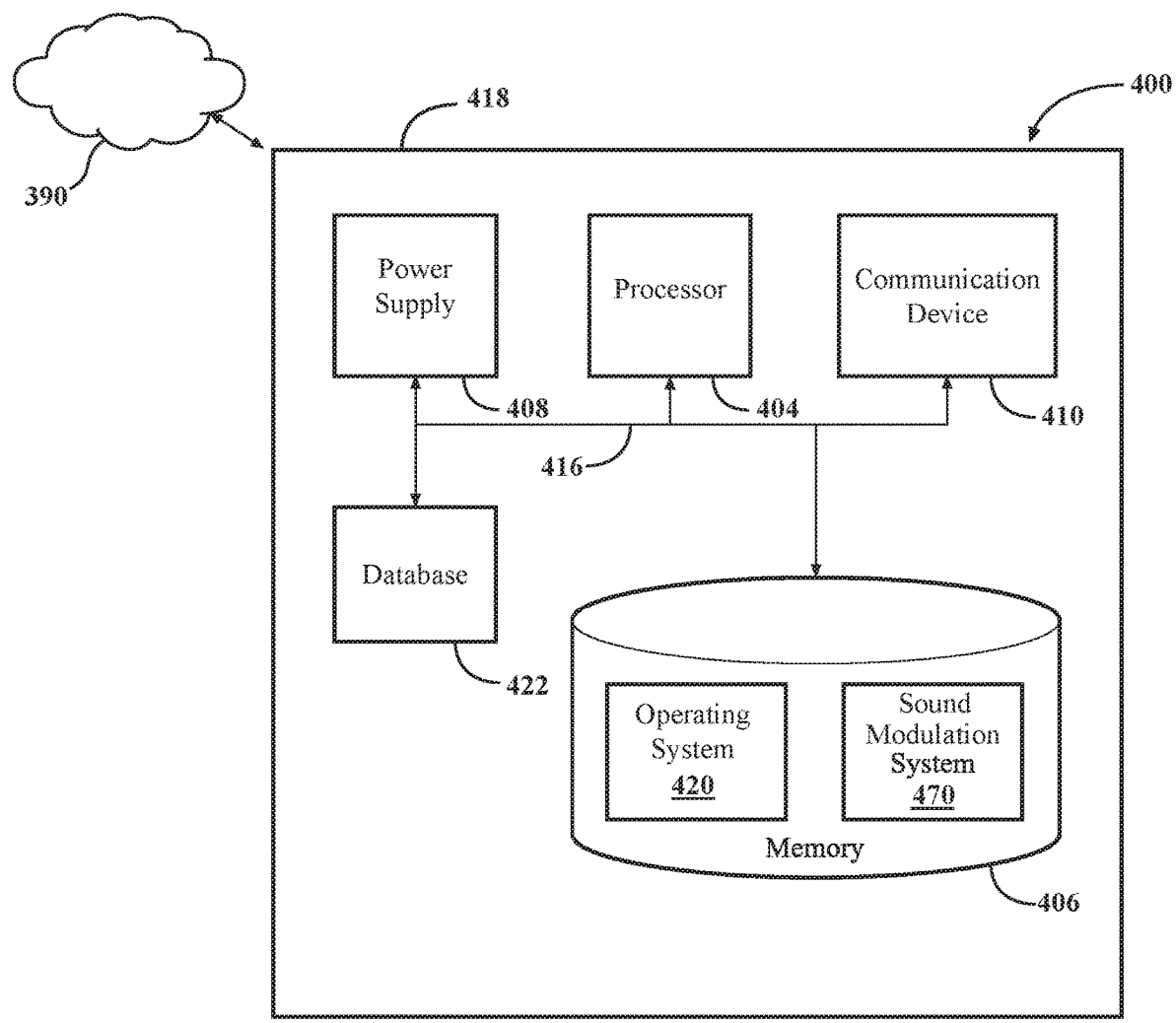
FIG. 4 is a computing device adaptable for use with one or more implementations described herein.

FIG. 4 is a block diagram of the computing device 400 usable with the sound-modulating window assembly 300 described above, according to one or more implementations. The computing device 400 can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application specific integrated circuit), or others. The computing device 400 can contain various components for performing the functions that are assigned to the the computing device. The components can include a processor 404, like a central processing unit (CPU), a memory 406, a power supply 408, communications device 410, input and/or output devices, and at least one bus 416 that connects the components above. In some implementations, one or more of these components are at least partially housed within a housing 418.

The processor 404, which can also be referred to as a CPU, can be a device which is capable of receiving and executing one or more instructions to perform a task as part of a computing device. In one or more implementations, the processor 404 can include a microprocessor such as an application specific instruction set processor (ASIP), graphics processing unit (GPU), a physics processing unit (PPU), a DSP, an image processor, a co-processor, or others. Though referenced as the processor 404, it is understood that one or more processors 404 can be used in one or more implementations described herein, including combinations of processors 404.

The memory 406 is any piece of hardware that is capable of storing data or information. Examples of data or information which can be stored in the memory 406 include, without limitation, data, program code in functional form, and/or other suitable information either on a temporary basis and/or a permanent basis. The memory 406 can include one or more modules that include computer-readable instructions that, when executed by the processor 404, cause the processor 404 to perform methods and functions that are discussed herein. The memory 406 can include volatile and/or non-volatile memory. The memory 406 can further include a computer-readable storage medium. Examples of suitable memory 406 include RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The memory 406 can be a component of the processor(s) 404, or the memory 406 can be operably connected to the processor(s) 404 for use thereby. The memory 406 can include an operating system 420, such as LINUX. The operating system 420 can include batch, live, time-sharing, real-time, and other types of operating systems. The operating system 420, as described herein, can include instructions for processing, accessing, writing, storing, searching data, or other functions as selected by the user for controlling and providing an interface with the computing device 400. The memory 406 can include communications procedures for communicating with the network 390, the sound modulation assembly 310, and/or another computing device.

The communication device 410 can be wired or wireless connection components and/or software allowing the computing device 400 to communicate with other computing devices. The communication device 410 can allow communication with devices either locally or remotely, such as over a network protocol (e.g., Ethernet or similar protocols). In one example, the computing device 400 can be operatively connected to the network 390 using the communication device 410. The communication device 410 can further be operatively connected with remote devices associated with other computing devices. In further implementations, the computing device 400 can connect with one or more computing devices, allowing access to one or more sensors, which can be operatively connected to or in operative connection with the second computing device.

The computing device 400 can further include a sound modulation system 470 or components thereof. As described herein, certain components of the sound modulation system 470 can be stored in a remote server, the computing device 400, or combinations thereof. As such, one or more implementations of the sound modulation system 470 can include the sound modulation system 470, modules thereof, or components thereof as being stored, collected, created, compared or otherwise made available from the memory 406 or the database 422 of the computing device 400. When stored as part of the computing device 400, the sound modulation system 470 can be operatively connected to the sound modulation assembly 310, another computing device 400, or other devices through the communications device 410 and the network 390, allowing for continuity between the one or more components which comprise the sound modulation system 470.

In one or more implementations, the computing device 400 can be in communication with a sound modulation assembly, such as the sound modulation assembly 200, 250, and 270, described with reference to FIGS. 2A-2C. The sound modulation assembly can include one or more of the elements described above with relation to the sound modulation assembly 200 or 250, such as the housing, the piezoelectric elements, and/or the actuator assemblies. Each of the piezoelectric elements and/or the actuator assemblies can be configured in a variety of configurations which allow for the creation of targeted sound modulation (e.g., dampening and/or noise cancellation). The sound modulation assembly can further be operatively connected with a window to cause such targeted sound modulation. The housing, the piezoelectric elements, and/or the actuator assemblies can be operatively connected with an edge region of the window. The sound modulation assembly can provide a mechanical resistance upon receiving an input, such as from the computing device 400 and/or the controller 330. In one or more implementations, the computing device 400 can interact with the sound modulation assembly through instructions from the sound modulation system 470.

Figure 5:
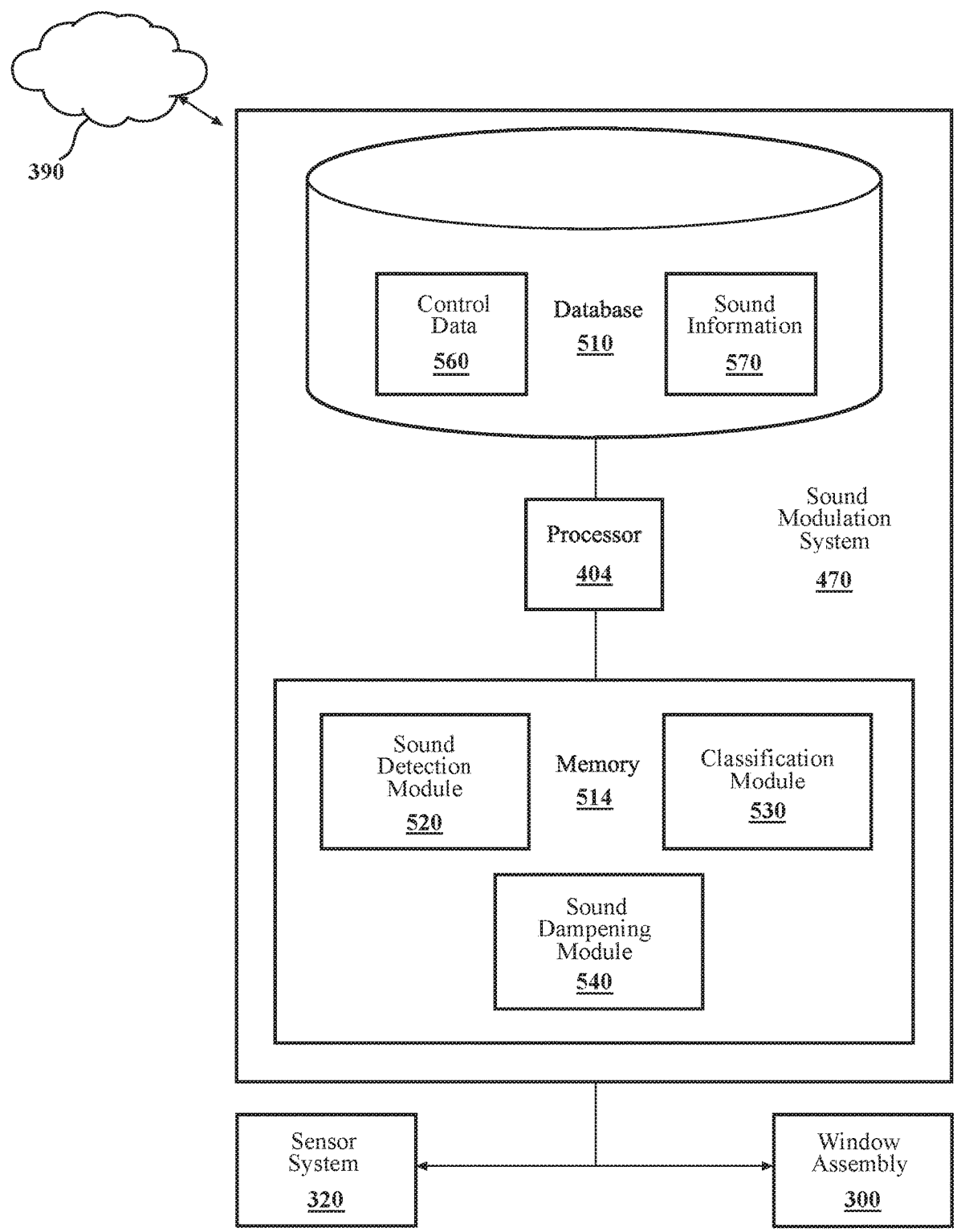
FIG. 5 is a sound modulation system for use with the sound-modulating window assembly, according to one or more implementations.

FIG. 5 shows an example of the sound modulation system 470, according to one or more implementations. The sound modulation system 470 is shown as including the processor 404 from the computing device 400, depicted in FIG. 4. Accordingly, the processor 404 can be a part of the sound modulation system 470, the sound modulation system 470 can include a separate processor from the processor 404 or the sound modulation system 470 can access the processor 404 through a data bus or another communication path. In one or more implementations, the sound modulation system 470 includes the memory 514 that can store a sound detection module 520, a classification module 530, and/or a sound modulation module 540. The memory 514 can be a RAM, read-only memory (ROM), a hard disk drive, a flash memory, or other suitable memory for storing the modules 520, 530, and 540. The modules 520, 530, and 540 are, for example, computer-readable instructions that when executed by the processor 404, cause the processor 404 to perform the various functions disclosed herein.

Further, one or more sensors can be used for collection of data as part of the sound modulation system 470. The sensor system 320 can collect sensor data about the environment. "Sensor data," as used herein, generally relates to any information collected by the sensors that the sound modulation assembly 200 is equipped with or operatively connected with, including the capabilities and other information about the sensors themselves. As an example, in one or more implementations, the sensor data can be stored as part of the sound information 570 from one or more of microphones, vibration sensors, or others of the sensor system 320. In some implementations, at least a portion of the sensor data can be located in one or more data stores, such as the database 510 as part of the sound modulation system 470. Alternatively, or in addition to, at least a portion of the sensor data can be located in one or more data stores that are located remotely from the sound modulation assembly 200, such as the database 422 of the computing device 400.

The sound modulation system 470 can further include a database 510. The database 510 can be presented in some configurations, including as part of the memory 514, as an independent component from the memory 514, as part of a separate memory (distinct from memory 514), or others. The database 510 can include control data 560 and sound information 570. The control data 560 can include data sets as detected or determined about each of the actuators regarding the order of operation, maximum deformation, current deformation, useful life and other details which can be used to control the sound modulation assembly during use. The sound information 570 can include information related to the sounds available in the current environment or others which can provide benefit to proper dampening, modulation, and/or cancellation by the sound modulation assembly. In one implementation, the sound information 570 can include one or more modulation profiles. The modulation profiles are control information for response to one or more of the sound parameters. The sound modulation system 470 or portions thereof, can be stored as part of the computing device 400, as part of a server, or others. As such, one or more of the functions of the sound modulation system 470 or the modules contained therein, can be performed remotely and transferred to the sound modulation assembly as part of the implementations described herein.

The sound detection module 520 can generally include instructions that function to control the processor 404 to detect one or more sounds using one or more sensors. The sound detection module 520 can begin by receiving input from one or more sensors. The one or more sensors can be in operative connection with the sound detection module 520, such as the sensor system 320 described with reference to FIG. 3. The one or more sensors can collect sound information 570 from the environment of the vehicle, such as road noises. Sound information 570 can include a profile of the sounds available from the vehicle environment, which can be raw or filtered information. Sound information 570 can further include one or more sound classifications, such as euphonious sounds and cacophonous sounds. The sound classifications can be groupings of shared features between one or more sounds, which can allow for easier detection and response. The sound classifications can be derived from a number of sources, such as occupant input or response, heuristic techniques (e.g., abrupt changes in tone or intensity), historical information, or others. The sound information 570 can be accumulated from one or more different sensor types. The sound information 570 can be retained or recorded in a sensor agnostic fashion, such as a written description. The sound information 570 can be stored as part of a database, such as in the database 510.

The classification module 530 can generally include instructions that function to control the processor 404 to compare the one or more sounds to the sound profile, the one or more sounds comprising a selected sound. The sound profile can be collected or stored information related to the desirability of one or more sounds. The sound profile can include definitions and categories of various sounds such that sounds can be distinguished in real-time. The one or more sounds, as received at the one or more sensors, can then be compared to the sound profile to categorize the sounds. In one implementation, the sound profile can include one or more selected sounds, such as user-selected sounds, commonly undesired sounds (e.g., noises), heuristically selected sounds, related sound fingerprints, and others. The selected sounds can include desired sounds, undesired sounds, or combinations thereof. The sound profile, the sound parameters, and the one or more selected sounds can be stored as part of the sound information 570, such as in the database 510.

The classification module 530 can further include instructions to evaluate the selected sound for one or more sound parameters. The classification module 530 can include instructions to separate and analyze the data received from sensor system 320 about the sounds to determine one or more sound parameters. The sound parameters, as used herein, can include wavelength, amplitude, period, frequency, power, intensity, propagation speed, and others which provide information about the sounds received by the vehicle. The sound parameters can be applied to determine direction, energy, transmissibility, and other factors about the sound waves. The sound parameters can be applied to determine a series of active responses, such that the sound can be mitigated. The classification module 530 can then associate the sound parameters with one or more sounds as part of a database. In one implementation, the sound parameters can be stored as part of the sound information 570, such as in the database 510.

The sound modulation module 540 can generally include instructions that function to control the processor 404 to determine a modulation profile corresponding to the sound parameters. The modulation profile, as used herein, refers to one or more movements which can be created by a variety of systems to minimize or reflect incoming or outgoing sound. The modulation profile can include either single rhythmic movements or combinations thereof to address one or more sounds, such as a plurality of sounds. In one example, the sound modulation module 540 can receive the one or more sound parameters about the one or more sounds, as collected at the classification module 530. Further, the sound modulation module 540 can create or modify the modulation profile in real-time. As such, the sound modulation module 540 can be responsive to changes in the sound environment. In one or more implementations, the modulation profile can dampen and/or reflect sound at the specific region of the sound-modulating window assembly 300 that is intended to respond to the one or more sounds. In further implementations, the modulation profile can be a series of vibrations intended to be equal and opposite of the selected sound. In further implementations, the modulation profile can be configured to create destructive interference with the one or more sounds, to reflect the one or more sounds, or combinations thereof.

The sound modulation module 540 can further include instructions to vibrate the sound-modulating window assembly using a modulation profile and the one or more soft hydrostatic actuator, the modulation profile affecting the transmission of the selected sound. The modulation profile can then be provided by the sound modulation module 540 to a system to produce the vibration in response to the one or more sounds, such as the sound-modulating window assembly 300. The sound modulation module 540 can include instructions to actuate or move one or more elements of the sound-modulating window assembly 300 as an individual element, as subgroups, in unison, or others. Sound modulation module 540 can further provide instructions to the sound-modulating window assembly 300 to resist or buffer vibrations, such as vibrations received from the sound. Both the current modulation profile and any historical modulation profile can be saved as part of the control data 560 in the database 510.

In further implementations, the sound modulation module 540 can include instructions to modulate the actuation strength of the one or more actuator assemblies. In one or more implementations, the sound modulation module 540 can include instructions to control the one or more actuators independently. As the one or more hydraulic actuators can make up the one or more actuator assemblies, each of the hydraulic actuators can provide a portion of the total actuation strength from the actuator assembly. Thus, by actuating one of the hydraulic actuators from a plurality of hydraulic actuators in the actuator assembly, only a portion of the actuation strength will be delivered to the window. As an example, in an actuator assembly containing five (5) actuators, by actuating one (1) of those actuators, the actuator assembly can deliver approximately 20% of the total actuation strength available to the actuator assembly. Other and further combinations and permutations are contemplated without further explicit recitation herein. As such, the actuation strength can be modulated in response to the sound amplitude of the selected sound.

Thus, the sound modulation system 470 can regulate the movement of the sound modulation assembly in light of sounds that are available in the environment. The sound modulation system 470 can receive sound input through the sensor system 320 about one or more sounds in the environment. The sound modulation system 470 can then produce one or more modulation profiles that are responsive to the sound input received. The one or more modulation profiles can then be delivered as instructions to the sound-modulating window assembly 300 to create one or more vibrations that reduce, mitigate, or reflect the one or more sounds. In this way, the sound modulation system 470 can produce a comfortable ambient environment for an occupant in a vehicle.

Figure 6:
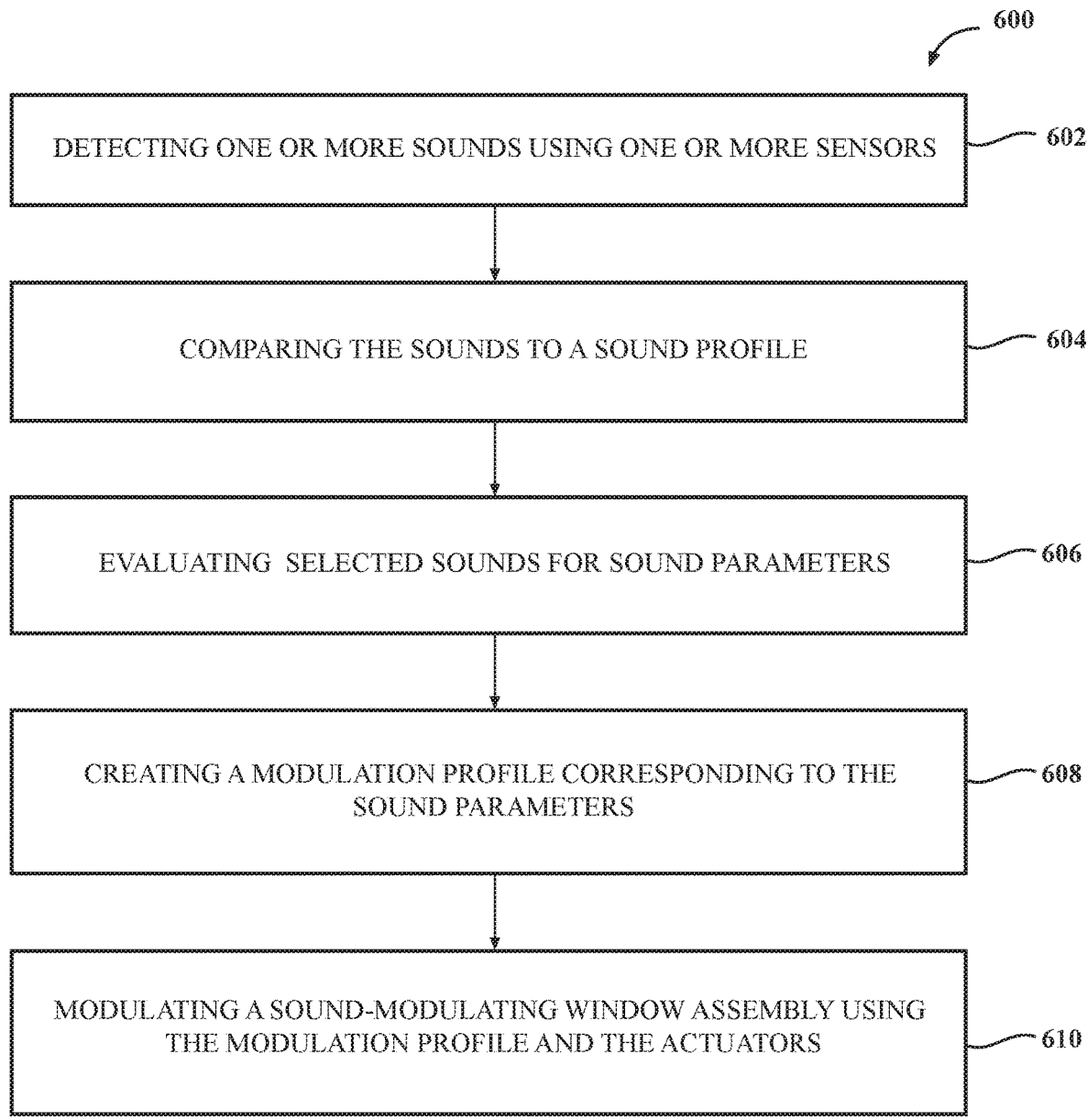
FIG. 6 is a method for controlling a sound-modulating window assembly, according to one or more implementations.

FIG. 6 is a block diagram of a method 600 for controlling a sound-modulating window assembly. Through the method 600, the sound-modulating window assembly can be controlled such that sounds which are undesired in the vehicle cabin can be mitigated or prevented from transmitting through to the occupant. The method 600 can include detecting one or more sounds using one or more sensors, at 602. The one or more sounds can then be compared to the sound profile, at 604. The one or more sounds can then be evaluated for one or more sounds and one or more sound parameters, at 606. A modulation profile corresponding to the sound parameters can be created, at 608. A window of a sound-modulating window assembly can then be modulated using the modulation profile and the one or more actuators, at 610. Though each of the elements of the method 600 are described discretely, it is understood that elements can be performed individually, simultaneously, or combinations thereof unless impracticable or stated otherwise.

The method 600 can begin by detecting one or more sounds by using one or more sensors, at 602. The method 600 can begin by receiving input from one or more sensors. The one or more sensors can be in operative connection with a sensor system, such as the sensor system 320 described with reference to FIG. 3. The one or more sensors can collect sound information from the environment of the vehicle, such as road noises. Sound information can include a variety of information, described above with reference to FIG. 5. Sound information can further include one or more sound classifications, such as euphonious sounds and cacophonous sounds. The sound classifications can be derived from a number of sources, such as occupant input or response, heuristic techniques (e.g., abrupt changes in tone or intensity), historical information, or others. The sound information can be accumulated from one or more different sensor types. The sound information can be retained or recorded in a sensor agnostic fashion, such as a written description.

The detection of one or more sounds can be performed as part of a system, such as the sound modulation system 470. The sound modulation system 470 can include the sound detection module 520. The sound detection module 520 can generally include instructions that function to control the processor 404 to detect one or more sounds using one or more sensors. The sound detection module 520 can begin by receiving input from one or more sensors. The sound information 570 can be collected, modified, recorded, and/or stored as part of a database, such as in the database 510.

The one or more sounds can then be compared to the sound profile, at 604. The method 600 can generally include comparing the one or more sounds to the sound profile, the one or more sounds comprising a selected sound. The sound profile can be collected or stored information regarding one or more sounds. The sound profile can include definitions and categories of various sounds such that sounds can be distinguished in real-time. The one or more sounds, as received at the one or more sensors, can then be compared to the sound profile to categorize the sounds and determine one or more sound parameters. In one implementation, the sound profile can include one or more selected sounds, such as user-selected sounds, commonly undesired sounds, heuristically selected sounds, related sound fingerprints, and others. The selected sounds can include desired sounds, undesired sounds, or combinations thereof.

The comparison of the one or more sounds to the sound profile can be performed as part of a system, such as the sound modulation system 470. The sound modulation system 470 can include the classification module 530. The classification module 530 can generally include instructions that function to control the processor 404 to compare the one or more sounds to the sound profile. The sound profile, the sound parameters, and the one or more selected sounds can be stored as part of the sound information 570, such as in the database 510.

The one or more sounds can then be evaluated for one or more sounds and one or more sound parameters, at 606. The method 600 can include analyzing the data received as part of the sound information from the sensor system to determine one or more sound parameters. The sound parameters, as used herein, can include wavelength, amplitude, period, frequency, power, intensity, propagation speed, and others which provide information about the sounds received by the vehicle. The method 600 can further detect changes in the sound parameters over time, effects of local interference and others related to changes in the sound parameters. The sound parameters can be applied to determine direction, energy, transmissibility, and other factors about the sound waves, such that the sound can be mitigated. The method 600 can then associate the detected sound parameters with one or more sounds.

The evaluation of sound parameters can be performed as part of a system, such as the sound modulation system 470. The sound modulation system 470 can include the classification module 530. The classification module 530 can generally include instructions that function to control the processor 404 to evaluate the one or more sounds for one or more sound parameters. The sound parameters can be stored as part of the sound information 570, such as in the database 510.

A modulation profile corresponding to the sound parameters can be created, at 608. The modulation profile, as used herein, refers to one or more movements which can be created by a variety of systems to minimize or reflect incoming or outgoing sound. The modulation profile can include either single rhythmic movements or combinations thereof to address one or more sounds, such as a plurality of sounds. Further, the method 600 can create or modify the modulation profile in real-time, such as in response to changes in the sound profile. As such, the method 600 can be responsive to changes in the sound environment. In one or more implementations, the modulation profile can reflect the specific region of the sound-modulating window assembly that is intended to respond to the one or more sounds. In further implementations, the modulation profile can be configured to create destructive interference with the one or more sounds, to reflect the one or more sounds, to dampen vibrations from the one or more sounds, or combinations thereof.

The creation of the modulation profile can be performed as part of a system, such as the sound modulation system 470. The sound modulation system 470 can include the sound modulation module 540. The sound modulation module 540 can generally include instructions that function to control the processor 404 to determine a modulation profile corresponding to the sound parameters. The modulation profile can be stored as part of the control data 560, such as in the database 510.

A window of a sound-modulating window assembly can then be modulated using the modulation profile and the one or more actuators, at 610. The method 600 can further include instructions to vibrate the sound-modulating window assembly using modulation profile and the one or more soft hydrostatic actuator. The modulation profile can be provided by the method 600 to a system, such as the controller 330 of the sound-modulating window assembly 300, to produce the vibration and/or dampening in response to the one or more sounds. The method 600 can actuate or move one or more elements of the sound-modulating window assembly as an individual element, as subgroups, in unison, or others. The method 600 can further vibrate and/or dampen to resist or buffer vibrations to the sound-modulating window assembly, such as vibrations received at the window from the sound. Thus, the modulation profile can affect the transmission of the selected sound to the vehicle cabin.

In further implementations, the method 600 can include instructions to modulate the actuation strength of the one or more actuator assemblies. In one or more implementations, the method can control the one or more actuators independently. As the one or more actuators can make up the one or more actuator assemblies, each of the actuators will provide a portion of the total actuation strength from the actuator assembly. As such, the actuation strength can be modulated by the method 600 in response to the sound amplitude of the selected sound.

The vibration of the sound-modulating window assembly can be performed as part of a system, such as the sound modulation system 470. The sound modulation system 470 can include the sound modulation module 540. The sound modulation module 540 can generally include instructions that function to control the processor 404 to vibrate the sound-modulating window assembly using the modulation profile and the one or more actuators. The vibrations created through the modulation profile can thus affect the transmission of the selected sound. Both the current modulation profile and any historical modulation profile can be saved as part of the control data 560, such as in the database 510.

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in operative connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, devices, and computer program products according to various implementations. In this regard, each block in the flowcharts or block diagrams can represent a module, segment, or portion of code, which can include one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which can include all the features enabling the implementation of the methods described herein and, which when loaded in a processing system, can carry out these methods.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in operative connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A sound-modulating window assembly for a vehicle, the window assembly comprising:
   a window having:
      an edge region;
      an inner surface; and
      an outer surface, the inner surface being configured to face a passenger compartment, and the outer surface being configured to face a vehicle exterior;
   one or more sensors configured to receive sensor information in response to one or more sounds; and
   a sound modulation assembly comprising:
      a controller configured to deliver one or more inputs to one or more actuating elements based on the sensor information; and
      one or more actuating elements including one or more actuator assemblies, the actuating elements configured to deliver force to at least a portion of the edge region in response to the one or more inputs, the one or more actuator assemblies including one or more actuators, each of the one or more actuators including:
         a first insulating portion forming a fluid-impermeable chamber;
         a dielectric fluid contained within the fluid-impermeable chamber;
         a first conductive portion operatively connected to an outer surface of the first insulating portion, the first conductive portion comprising a conductive material; and
         a second conductive portion operatively connected to an outer surface of the first insulating portion and separated from the first conductive portion by the fluid-impermeable chamber, the second conductive portion comprising a conductive material; and
         a second insulating portion surrounding an exterior surface of the first conductive portion and an exterior surface of the second conductive portion,
      each of the one or more actuators being configured such that, when electrical energy is supplied to the first conductive portion and the second conductive portion, the first conductive portion and the second conductive portion have opposite charges, whereby the first conductive portion and the second conducive portion are electrostatically attracted toward each other to cause at least a portion of the dielectric fluid to be displaced to an edge region of the fluid chamber and such that an overall height of the actuator increases.

2. The sound-modulating window assembly of claim 1, wherein the first insulating portion and the second insulating portion comprise an insulating elastomer.

3. The sound-modulating window assembly of claim 1, wherein the actuator assemblies comprise a plurality of actuators positioned in series.

4. The sound-modulating window assembly of claim 1, further comprising one or more piezoelectric elements configured to vibrate at least a portion of the window in response to the one or more inputs from the controller.

5. The sound-modulating window assembly of claim 1, wherein the sensor information includes one or more sound parameters.

6. The sound-modulating window assembly of claim 5, wherein the one or more sound parameters are used by the controller to create a modulation profile.

7. The sound-modulating window assembly of claim 1, wherein the controller is configured to actuate the one or more actuating elements in subgroups.

8. A sound modulation system for controlling a sound-modulating window assembly of a vehicle, comprising:
   a sound-modulating window assembly having:
      a window; and
      one or more actuator assemblies, the one or more actuator assemblies being operatively positioned with respect to the window, the one or more actuator assemblies including one or more actuators, each of the one or more actuators including:
         a first insulating portion forming a fluid-impermeable chamber;
         a dielectric fluid contained within the fluid-impermeable chamber;
         a first conductive portion operatively connected to an outer surface of the first insulating portion, the first conductive portion comprising a conductive material; and
         a second conductive portion operatively connected to an outer surface of the first insulating portion and separated from the first conductive portion by the fluid-impermeable chamber, the second conductive portion comprising a conductive material; and
         a second insulating portion surrounding an exterior surface of the first conductive portion and an exterior surface of the second conductive portion,
         each of the one or more actuators being configured such that, when electrical energy is supplied to the first conductive portion and the second conductive portion, the first conductive portion and the second conductive portion have opposite charges, whereby the first conductive portion and the second conducive portion are electrostatically attracted toward each other to cause at least a portion of the dielectric fluid to be displaced to an edge region of the fluid chamber and such that an overall height of the actuator increases;
   one or more processors; and
   a memory communicably coupled to the one or more processors and storing:
      a sound detection module including instructions that when executed by the one or more processors cause the one or more processors to detect one or more sounds using one or more sensors;
      a classification module including instructions that when executed by the one or more processors cause the one or more processors to compare the one or more sounds to a sound profile to determine one or more selected sounds, and to evaluate the one or more selected sounds for one or more sound parameters; and
      a sound modulation module including instructions that when executed by the one or more processors cause the one or more processors to create a modulation profile corresponding to at least one of the one or more sound parameters, and to activate the one or more actuator assemblies according to the modulation profile to alter one or more dampening characteristics of the window, the modulation profile affecting transmission of the selected sound.

9. The sound modulation system of claim 8, wherein a sound modulation assembly further comprises:
   a housing which receives at least a portion of the window; and
   a controller configured to deliver one or more inputs to the one or more actuator assemblies in response to the one or more sound parameters, wherein the one or more actuator assemblies are configured to deliver hydraulic force to at least a portion of the window in response to one or more inputs.

10. The sound modulation system of claim 9, wherein the sound modulation module further comprises instructions to modulate actuation strength by controlling a number of the one or more actuators which are actuated in the each of the one or more actuator assemblies.

11. The sound modulation system of claim 8, wherein the modulation profile is a pattern of vibrations which reflect or dampen the one or more selected sounds.

12. The sound modulation system of claim 8, wherein the classification module further comprises sound classifications.

13. The sound modulation system of claim 12, wherein the sound classifications comprises sounds which are selected based on input from an occupant of the vehicle.

14. The sound modulation system of claim 8, wherein the sound detection module further comprises instructions to detect the one or more sounds based on regions of the window.

15. The sound modulation system of claim 8, wherein the sound modulation module further comprises instructions to modulate actuation strength of the one or more actuator assemblies.

16. The sound modulation system of claim 15, wherein the actuation strength is modulated in response to sound amplitude of the one or more selected sounds.

17. A method for controlling a sound-modulating window assembly, comprising:
   detecting one or more sounds using one or more sensors;
   comparing the one or more sounds to a sound profile to determine one or more selected sounds;
   evaluating the one or more selected sounds for one or more sound parameters;
   creating a modulation profile corresponding to at least one of the one or more sound parameters; and
   modulating a sound-modulating window assembly using the modulation profile and one or more actuators, the modulation profile affecting transmission of the selected sound, each of the one or more actuators including:
      a first insulating portion forming a fluid-impermeable chamber;
      a dielectric fluid contained within the fluid-impermeable chamber;
      a first conductive portion operatively connected to an outer surface of the first insulating portion, the first conductive portion comprising a conductive material; and
      a second conductive portion operatively connected to an outer surface of the first insulating portion and separated from the first conductive portion by the fluid-impermeable chamber, the second conductive portion comprising a conductive material; and
      a second insulating portion surrounding an exterior surface of the first conductive portion and an exterior surface of the second conductive portion,
      each of the one or more actuators being configured such that, when electrical energy is supplied to the first conductive portion and the second conductive portion, the first conductive portion and the second conductive portion have opposite charges, whereby the first conductive portion and the second conducive portion are electrostatically attracted toward each other to cause at least a portion of the dielectric fluid to be displaced to an edge region of the fluid chamber and such that an overall height of the actuator increases.

18. The method of claim 17, further comprising modulating an actuation strength of the one or more actuators.

19. The method of claim 17, wherein the sound profile includes historical information from one or more occupants of a vehicle.

* * * * *